US010778336B2

(12) United States Patent
Mougin et al.

(10) Patent No.: US 10,778,336 B2
(45) Date of Patent: Sep. 15, 2020

(54) COMMUNICATION SYSTEM EMPLOYING SELF-TUNING OPTICAL TRANSCEIVERS

(71) Applicant: Alcatel Submarine Networks, Nozay (FR)

(72) Inventors: Christophe Mougin, Valpuiseaux (FR); Eric Ternier, Paris (FR)

(73) Assignee: Alcatel Submarine Networks, Nozay (FR)

( * ) Notice: Subject to any disclaimer, the term of this patent is extended or adjusted under 35 U.S.C. 154(b) by 0 days.

(21) Appl. No.: 16/427,514

(22) Filed: May 31, 2019

(65) Prior Publication Data

US 2019/0379457 A1 Dec. 12, 2019

(30) Foreign Application Priority Data

Jun. 6, 2018 (EP) ..................................... 18305689

(51) Int. Cl.
| | | |
|---|---|---|
| *H04B 10/079* | (2013.01) | |
| *H04B 10/564* | (2013.01) | |
| *H04B 10/40* | (2013.01) | |
| *H04B 10/50* | (2013.01) | |
| *H04J 14/02* | (2006.01) | |

(52) U.S. Cl.
CPC ........... *H04B 10/40* (2013.01); *H04B 10/503* (2013.01); *H04B 10/564* (2013.01); *H04J 14/0221* (2013.01)

(58) Field of Classification Search
CPC ........................ H04B 10/07953; H04B 10/564
See application file for complete search history.

(56) References Cited

U.S. PATENT DOCUMENTS 6,735,725 B1 * 5/2004 Wu ..................... H04J 14/0221
714/704
9,071,364 B1 6/2015 Voois et al.
(Continued)

OTHER PUBLICATIONS

G. Barlow, "A G.709 Optical Transport Networks Tutorial", Viavi Solutions, 2015.*
(Continued)

*Primary Examiner* — Shi K Li
(74) *Attorney, Agent, or Firm* — Mendelsohn Dunleavy, P.C.; Yuri Gruzdkov

(57) ABSTRACT

An optical transceiver capable of optimizing the performance of the corresponding optical channel by dynamically adjusting the optical power of the output signal in response to the FEC-performance data received from the corresponding remote transceiver. In an example embodiment, the FEC-performance data can be exchanged by the two optical transceivers using a dedicated field in the overhead of the transmitted data frames. The power-adjustment process is configured to be relatively slow to prevent the occurrence of transients on other optical channels and ensure stable operation of the corresponding WDM system as a whole, while different transceivers thereof are allowed to adjust their respective output powers in an autonomous way and independent of each other. The performance optimization can be directed at meeting a predefined performance target specified by the system designer or operator while driving the operating point away from conditions under which nonlinear optical effects may become relatively prominent.

17 Claims, 9 Drawing Sheets

(56) References Cited

U.S. PATENT DOCUMENTS

| | | |
|---|---|---|
| 9,331,780 B1 | 5/2016 | Zhou et al. |
| 9,414,135 B2 | 8/2016 | Patel et al. |
| 9,647,782 B2 | 5/2017 | Lorenz et al. |
| 9,712,899 B2 | 7/2017 | Weldon et al. |
| 2004/0037569 A1 | 2/2004 | Kamalov et al. |
| 2014/0003809 A1 | 1/2014 | Portier et al. |
| 2014/0086575 A1* | 3/2014 | Fukushi ............... H04B 10/695 398/26 |
| 2016/0373186 A1* | 12/2016 | Alshinnawi ...... H04B 10/07953 |
| 2017/0279533 A1 | 9/2017 | Elahmadi et al. |
| 2017/0353246 A1 | 12/2017 | Frankel et al. |

OTHER PUBLICATIONS

ITU-T G.709/Y.1331, "Interfaces for the optical transport network", pp. 1-244 (2016).

Gorshe, Steve. "A tutorial on ITU-T G. 709 optical transport networks (OTN)." PMC-Sierra, Inc., Document No. PMC-2081250 Issue 1 (2010).

ITU-T G.694.1, "Spectral grids for WDM applications: DWDM frequency grid", pp. 1-16 (2012).

Kachris, Christoforos, et al. "Reconfigurable FEC codes for software-defined optical transceivers." 2014 13th International Conference on Optical Communications and Networks (ICOCN). IEEE, 2014.

Ji, Philip N. "Software defined optical network." The 2012 11th International Conference on Optical Communications and Networks (ICOCN). IEEE, 2012.

Walker, Timothy P. "Optical Transport Network (OTN) Tutorial", https://www.itu.int/ITU-T/studygroups/com15/otn/OTNtutorial.pdf, Feb. 15, 2000, 62 pages.

* cited by examiner

110

ODUk

OTUk

OTU OH

606

704

714

COMMUNICATION SYSTEM EMPLOYING SELF-TUNING OPTICAL TRANSCEIVERS

BACKGROUND

Field

Various example embodiments relate to optical communication equipment and, more specifically but not exclusively, to communication systems employing optical transmitters and receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

A fiber-optic system typically employs an optical transmitter at one end of a fiber and an optical receiver at the other end of the fiber. Some fiber-optic systems operate by transmitting in one direction on one fiber and in the opposite direction on another fiber to achieve full duplex (FDX) operation. An FDX system can be implemented using optical transceivers, with an optical transceiver being an electro-optical subsystem that includes a respective optical transmitter and a respective optical receiver, typically integrated in a manner that supports the intended function. The telecom industry and its suppliers develop, manufacture, sell, and use a large variety of optical transceivers for many different applications.

SUMMARY OF SOME SPECIFIC EMBODIMENTS

Disclosed herein are various embodiments of an optical transceiver capable of optimizing the performance of the corresponding optical channel by dynamically adjusting the optical power of the output signal in response to the FEC-performance data received from the corresponding remote transceiver. In an example embodiment, the FEC-performance data can be exchanged by the two optical transceivers using a dedicated field in the overhead of the transmitted data frames. The power-adjustment process is configured to be relatively slow to prevent the occurrence of transients on other optical channels and ensure stable operation of the corresponding WDM system as a whole, while different transceivers thereof are allowed to adjust their respective output powers in an autonomous way and independent of each other. The performance optimization can be directed at meeting a predefined performance target specified by the system designer or operator while driving the operating point away from conditions under which nonlinear optical effects may become relatively prominent.

According to an example embodiment, provided is an apparatus comprising an optical data receiver, an optical data transmitter, and an electronic controller connected therebetween, the optical data receiver including a photodetector configured to detect an optical input signal carrying a first data frame, the optical data transmitter including a laser configured to generate a carrier wavelength for an optical output signal; wherein the optical data receiver comprises a frame decoder configured to read a first value of a measure of transmission quality from the first data frame, the measure of transmission quality representing an error rate at which an FEC code used at a remote receiver encounters errors in data transmitted using the optical output signal; and wherein the electronic controller is configured to change an optical output power of the laser in response to the first value of the measure of transmission quality provided thereto by the frame decoder.

According to another example embodiment, provided is an apparatus comprising an optical data receiver, an optical data transmitter, and an electronic controller connected therebetween, the optical data receiver including a photodetector configured to detect an optical input signal carrying a first data frame, the optical data transmitter including a laser configured to generate a carrier wavelength for an optical output signal carrying a second data frame; wherein the optical data receiver comprises a frame decoder configured to count a number of errors corrected in the first data frame using an FEC data block thereof; wherein the electronic controller is configured to compute a first value of a measure of transmission quality using the number of errors counted by the frame decoder; and wherein the optical data transmitter comprises a frame generator configured to write the first value of the measure of transmission quality into the second data frame.

According to yet another example embodiment, provided is a communication method carried out at an optical transceiver, the method comprising the steps of: receiving an optical input signal carrying a first data frame; decoding the first data frame to read a first value of a measure of transmission quality from the first data frame, the measure of transmission quality representing an error rate at which an FEC code used at a remote receiver encounters errors in data received from the optical transceiver; and changing an optical output power of a laser in response to the first value of the measure of transmission quality, the laser being configured to generate a carrier wavelength for an optical output signal directed to the remote receiver.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
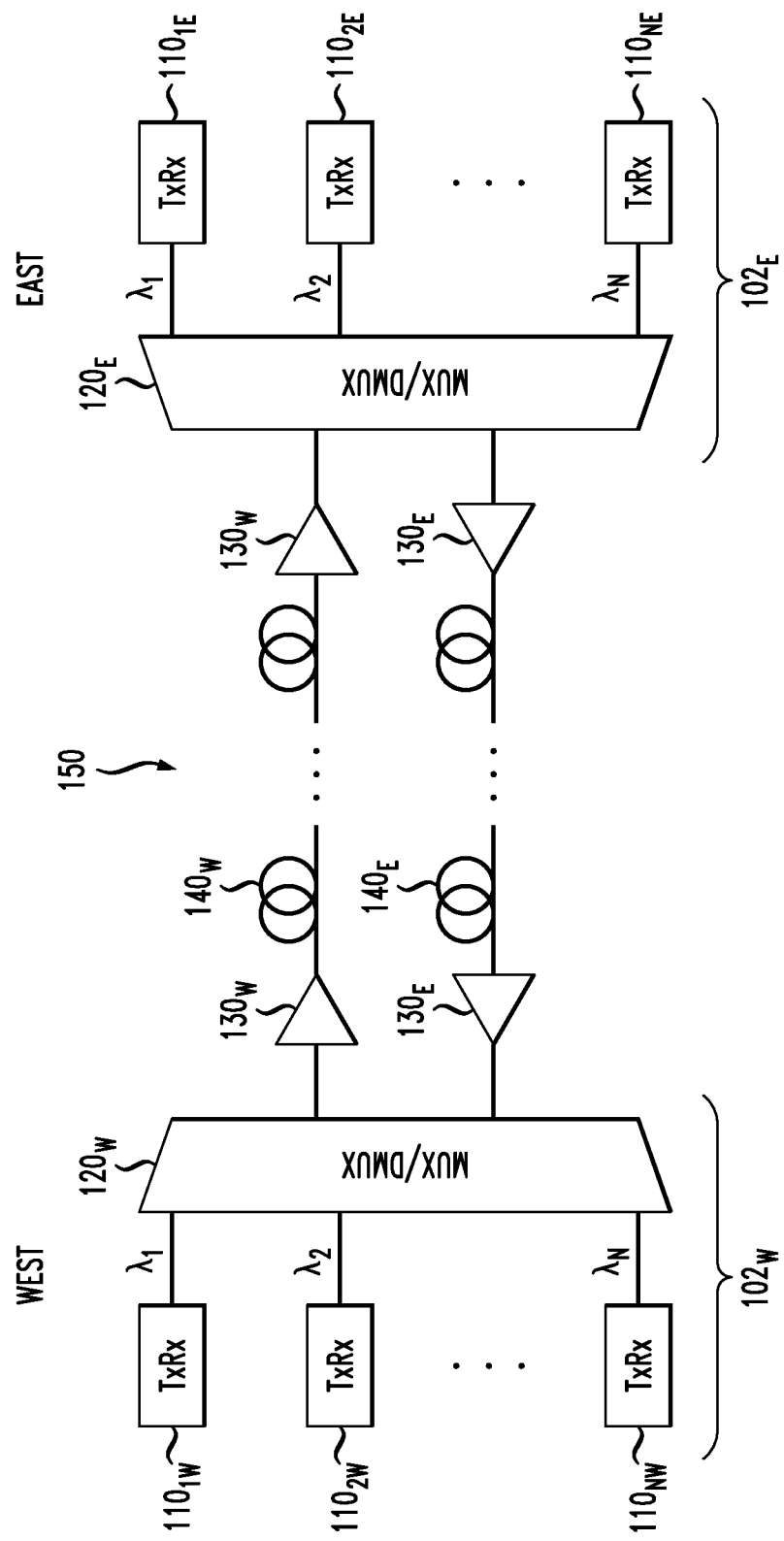
FIG. 1 shows a block diagram of an optical communication system according to an embodiment.

FIG. 1 shows a block diagram of an optical communication system 100 according to an embodiment. System 100 comprises wavelength-division-multiplexing (WDM) transceivers $102_W$ and $102_E$ connected using a fiber-optic link 150. For illustration purposes and to simplify the description, WDM transceivers $102_W$ and $102_E$ are referred-to herein as being located at the West and East ends, respectively, of link 150. This notation should not be interpreted to imply any preference or limitation with respect to the geo-positioning of system 100.

In some embodiments, system 100 complies with the ITU-T G.709/Y.1331 Recommendation, which is incorporated herein by reference in its entirety.

In an example embodiment, link 150 can be implemented using two or more optical fibers, e.g., including fibers $140_W$ and $140_E$, with at least one fiber per propagation direction. As indicated in FIG. 1, fiber $140_W$ is configured to transmit Eastward-propagating optical signals, whereas fiber $140_E$ is configured to transmit Westward-propagating optical signals. In addition, link 150 typically has optical amplifiers $130_W$ and $130_E$. Each of optical amplifiers $130_W$ is connected between two respective sections of fiber $140_W$. Each of optical amplifiers $130_E$ is similarly connected between two respective sections of fiber $140_E$.

In some embodiments, link 150 may comprise an undersea cable system that includes, inter alia, submersible optical repeaters, each including at least one optical amplifier $130_E$ and at least one optical amplifier $130_W$. Link 150 may also incorporate additional optical elements (not explicitly shown in FIG. 1), such as optical splitters, combiners, couplers, switches, etc., as known in the pertinent art.

In an example embodiment, an optical amplifier 130 can be implemented as known in the pertinent art, e.g., using an erbium-doped fiber, a gain-flattening filter, and one or more laser-diode pumps. The number of optical amplifiers 130 used in optical link 150 depends on the particular embodiment and may be in the range, e.g., from 1 to ~200. A typical length of the span of fiber $140_W$ or $140_E$ between two adjacent optical amplifiers 130 may range from ~50 km to ~100 km.

In some embodiments, link 150 may not have any optical amplifiers 130 therein.

In an example embodiment, WDM transceivers $102_W$ and $102_E$ are configured to use carrier wavelengths $\lambda_1$-$\lambda_1$ arranged on a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 186 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528.8 nm to about 1563.9 nm, the 100-GHz spacing between the centers of neighboring WDM channels is equivalent to approximately 0.8 nm spacing. In alternative embodiments, other suitable frequency grids (e.g., flexible or having other spacing grids) can also be used.

In some embodiments, the set of carrier wavelengths used for generating Eastward-propagating optical WDM signals may be different from the set of carrier wavelengths used for generating Westward-propagating optical WDM signals.

In some embodiments, system 100 can be configured to transport polarization-division-multiplexed (PDM) signals, wherein each of the two orthogonal polarizations of each optical WDM channel can be used to carry a different respective data stream.

In an example embodiment, WDM transceiver $102_W$ comprises N individual-channel transceivers $110_{1W}$-$110_{NW}$, where the number N is an integer greater than one. Each of transceivers $110_{1W}$-$110_{NW}$ comprises a respective optical transmitter (not explicitly shown in FIG. 1; see FIG. 2) configured to generate a respective WDM component of the Eastward-propagating optical WDM signal using a different respective carrier wavelength (e.g., one of wavelengths $\lambda_1$-$\lambda_N$, as indicated in FIG. 1). A multiplexer/demultiplexer (MUX/DMUX) $120_W$ operates to combine these WDM components, thereby generating the corresponding Eastward-propagating optical WDM signal that is applied to fiber $140_W$ for transmission to WDM transceiver $102_E$. Along the propagation path, this WDM signal is amplified using optical amplifiers $130_W$.

Each of transceivers $110_{1W}$-$110_{NW}$ further comprises a respective optical receiver (not explicitly shown in FIG. 1; see FIG. 2) configured to detect and decode a respective WDM component of the Westward-propagating optical WDM signal received by way of fiber $140_E$ from WDM transceiver $102_E$. Along the propagation path, the Westward-propagating optical WDM signal is amplified using optical amplifiers $130_E$. MUX/DMUX $120_W$ operates to separate the WDM components of the received Westward-propagating optical WDM signal, thereby generating optical input signals for the optical receivers of the individual-channel transceivers $110_{1W}$-$110_{NW}$.

In an example embodiment, MUX/DMUX $120_W$ can be implemented as known in the pertinent art, e.g., using one or more of the following: (i) a wavelength-selective optical filter; (ii) a wavelength-selective switch; (iii) a diffraction grating; (iv) an array of micro-mirrors; (v) a MEMS device; and (vi) an LCoS filter or modulator. Herein, the acronym "MEMS" refers to micro-electro-mechanical systems; and the acronym "LCoS" refers to liquid crystal on silicon.

In an example embodiment, WDM transceiver $102_E$ is constructed using components similar to those of WDM transceiver $102_W$ and configured to operate in a similar manner. A description of WDM transceiver $102_E$ can therefore be obtained from the above description of WDM transceiver $102_W$, e.g., by interchanging the subscripts E and W.

Descriptions of the example structure and operation of an individual-channel transceiver 110 are given below in reference to FIGS. 2-12. In the embodiment shown in FIG. 1, each of WDM transceivers $102_W$ and $102_E$ comprises a respective plurality of such nominally identical transceivers 110. A person of ordinary skill in the art will understand that other suitable compositions of WDM transceivers $102_W$ and $102_E$ may also be used in some alternative embodiments.

Figure 2:
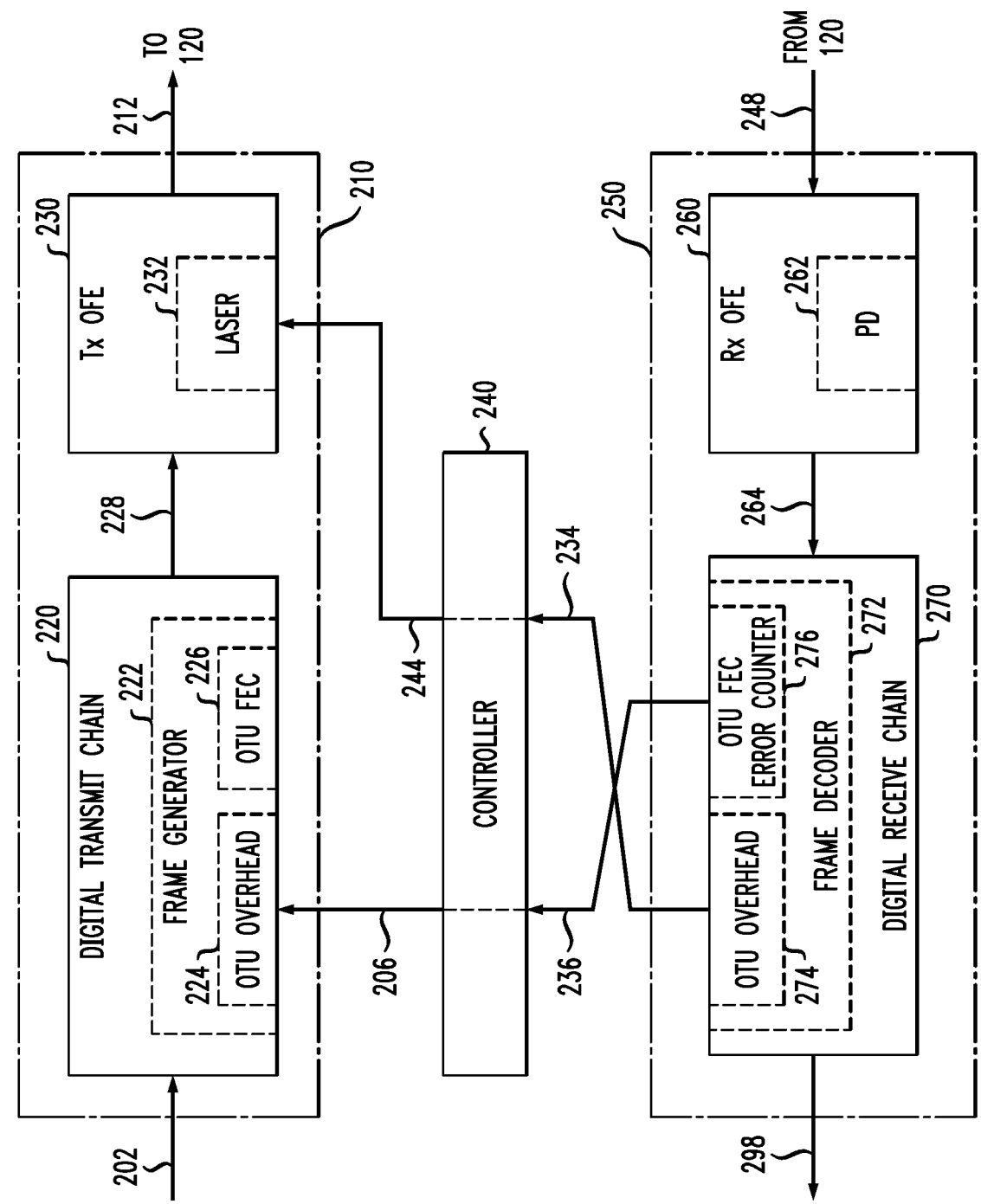
FIG. 2 shows a block diagram of an optical transceiver that can be used in the communication system of FIG. 1 according to an embodiment.

FIG. 2 shows a block diagram of an optical transceiver 110 that can be used in system 100 (FIG. 1) according to an embodiment. Transceiver 110 comprises an optical transmitter 210, an electronic controller 240, and an optical receiver 250 interconnected as indicated in FIG. 2. Transmitter 210 is configured to generate a modulated optical signal 212 having encoded thereon client data 202. Modulated optical signal 212 is applied to MUX/DMUX 120 for coupling into link 150 (see FIG. 1) as a component of the corresponding output WDM signal. Receiver 250 is configured to receive a modulated optical signal 248 having encoded thereon client data 298. Modulated optical signal 248 is applied to receiver 250 by MUX/DMUX 120 in response to receiving the corresponding input WDM signal from link 150 (see FIG. 1).

Transmitter 210 comprises a transmitter optical front end (Tx OFE) 230 interfaced with a digital transmit chain 220. In operation, digital transmit chain 220 generates an electrical output signal 228 configured to drive OFE 230 in a manner that causes the resulting modulated optical signal 212 to carry, inter alia, client data 202. OFE 230 comprises a laser 232 configured to generate an optical carrier wave for the modulated optical signal 212, the generated optical carrier wave having one of wavelengths $\lambda_1$-$\lambda_N$ (see FIG. 1). The optical output power of laser 232 can be changed using a control signal 244 generated by controller 240, e.g., as described further below.

In an example embodiment, OFE 230 may include (i) an optical modulator (not explicitly shown in FIG. 2) configured to generate the modulated optical signal 212 by modulating the optical carrier wave generated by laser 232 and (ii) a driver circuit (not explicitly shown in FIG. 2) configured to electrically drive the optical modulator in response to electrical signal 228. Depending on the embodiment, the optical modulator used in OFE 230 can be implemented using one or more optical IQ modulators, Mach-Zehnder modulators, amplitude modulators, phase modulators, and/or intensity modulators. In some embodiments, laser 232 can be a directly modulated laser, e.g., a laser diode configured to generate the modulated optical signal 212 in response to modulated electrical currents directly applied thereto by the corresponding driver circuit. Driver circuits for electrically driving the various optical modulators and/or directly modulated lasers that may be used in various embodiments of OFE 230 for the above-described purposes are known to those skilled in the pertinent art.

In an example embodiment, digital transmit chain 220 comprises a plurality of processing modules, only one of which, i.e., a frame generator 222, is explicitly shown in FIG. 2 for clarity. Additional processing modules (not explicitly shown in FIG. 2) that can be used in digital transmit chain 220 are known to persons skilled in the pertinent art and may be implemented using digital circuits conventionally used for these purposes.

In an example embodiment, frame generator 222 is configured to perform at least some of the following:
 (A) receive client data 202, e.g., from the corresponding access or local-area network;
 (B) insert client data 202 into a frame payload area, which together with the corresponding overhead information forms an Optical Payload Unit (OPU);
 (C) add an operation-administration-management (OAM) overhead to an OPU to generate a corresponding Optical Data Unit (ODU); and
 (D) generate an Optical Transport Unit (OTU) by adding an OTU overhead and extending the corresponding ODU with a forward-error-correction (FEC) data block.

FIG. 2 explicitly shows only two processing sub-modules (see reference numerals 224 and 226 in FIG. 2) of frame generator 222, which correspond to the above-listed processing step (D). For example, sub-module 224 is configured to insert the OTU overhead into the appropriate fields of the corresponding ODU. Sub-module 226 is configured to apply an FEC code to the (entire) ODU to generate the corresponding FEC data block, which is then appended to the ODU, thereby extending the latter to form the OTU (also see FIGS. 3A-3B). A person of ordinary skill in the art will understand how to make and use other constituent sub-modules of frame generator 222, e.g., those corresponding to the above-listed processing steps (A)-(C).

Digital transmit chain 220 typically comprises additional modules (not explicitly shown in FIG. 2) that are known to persons skilled in the pertinent art and conventionally used in such digital transmit chains.

Receiver 250 comprises a receiver optical front end (Rx OFE) 260 interfaced with a digital receive chain 270. OFE 260 comprises a photodetector (PD) 262 and operates to convert the received modulated optical signal 248 into a corresponding electrical signal 264. Digital receive chain 270 then processes electrical signal 264 to recover client data 298 encoded in the received modulated optical signal 248.

In some embodiments, OFE 260 is an optical demodulator that can be configured as known in the pertinent art for coherent (e.g., intradyne or homodyne) detection of signal 248. In such embodiments, OFE 260 may also include: (i) an optical local-oscillator (LO) source; and (ii) an optical hybrid configured to optically mix signal 248 and the LO signal generated by the optical LO source. In such embodiments, photodetector 262 is configured to convert the optical interference signals generated by the optical hybrid into the corresponding sub-signals of electrical signal 264.

In some other embodiments, OFE 260 is an optical demodulator that can be configured for direct (e.g., square law, intensity) detection of signal 248. In such embodiments, photodetector 262 is configured to generate electrical signal 264 to be proportional to the intensity (optical power, squared amplitude of the electric field) of signal 248.

In an example embodiment, digital receive chain 270 comprises a plurality of processing modules, only one of which, i.e., a frame decoder 272, is explicitly shown in FIG. 2 for clarity. Additional processing modules (not explicitly shown in FIG. 2) that can be used in digital receive chain 270 are known to persons skilled in the pertinent art and may be implemented using digital circuits conventionally used for these purposes.

In an example embodiment, frame decoder 272 is configured to perform at least some of the following:
 (E) correct errors in the received OTU using the FEC data block thereof;
 (F) count the number of errors that have been corrected using the OTU FEC data block(s) during step(s) (F);
 (G) read and extract information from the OTU overhead of the received OTU;
 (H) unwrap the OTU to recover the corresponding ODU and then the corresponding OPU;
 (I) extract client data 298 from the payload area of the OPU; and (J) apply the extracted client data 298 to the corresponding access or local-area network for delivery to the corresponding clients.

FIG. 2 explicitly shows only two processing sub-modules (see reference numerals 274 and 276 in FIG. 2) of frame decoder 272, which correspond to the above-listed processing steps (F) and (G). For example, sub-module 276 is configured to count the number of errors that have been corrected in the (entire) OTU using the FEC data block thereof and provide the resulting error count, by way of a control signal 236, to controller 240. Sub-module 274 is configured to extract information from at least some fields of the OTU overhead and provide the extracted information, by way of a control signal 234, to controller 240. A person of ordinary skill in the art will understand how to make and use other constituent sub-modules of frame decoder 272, e.g., those corresponding to the processing steps (E) and (H)-(J).

Controller 240 operates to generate control signal 244 for laser 232 in response to control signal 234 received from frame decoder 272. Controller 240 further operates to generate a control signal 206 in response to control signal 236. Frame generator 226 then operates to insert at least some of the information received by way of control signal 206 into the OTU overhead of the outgoing data frame. Example operating methods that can be implemented in controller 240 for these and other purposes are described in more detail below in reference to FIGS. 5-12.

Figure 3A:
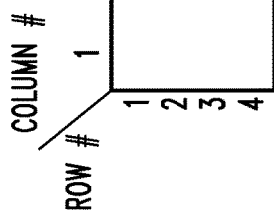
FIGS. 3A-3C pictorially show a frame structure that can be used in the communication system of FIG. 1 according to an embodiment.
Figure 3B:
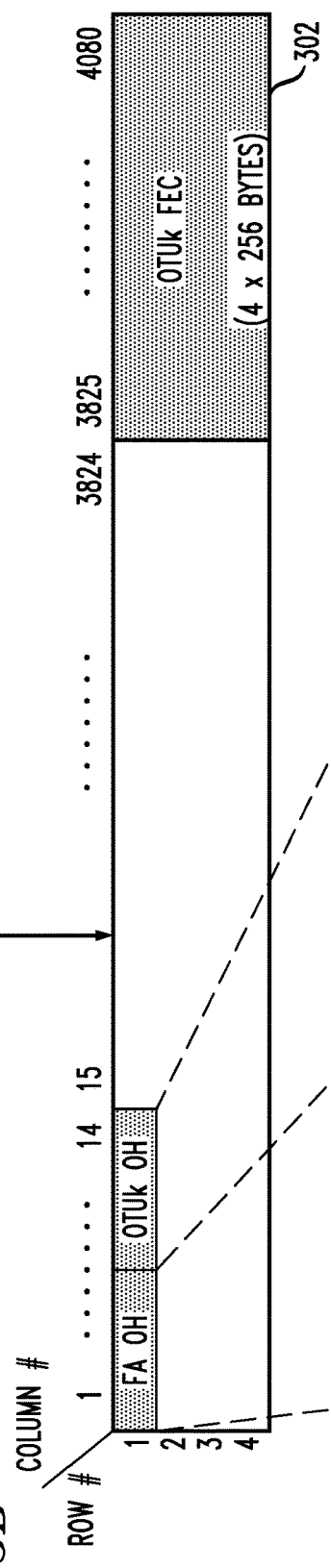
Figure 3C:
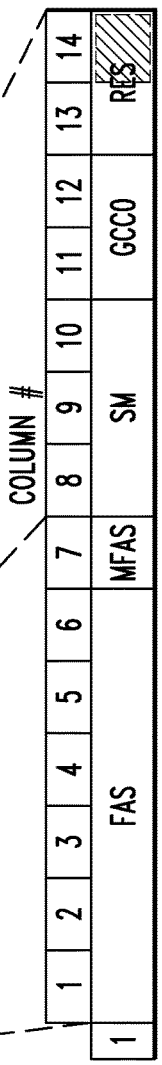

FIGS. 3A-3C pictorially show a frame structure that can be used in system 100 (FIG. 1) and by transceiver 110 (FIG. 2) according to an example embodiment. The shown frame structure complies with the above-cited ITU-T G.709/Y.1331 Recommendation. A person of ordinary skill in the art will understand that other suitable frame structures may similarly be used in alternative embodiments of system 100.

FIG. 3A pictorially shows an optical data unit ODUk that can be generated by frame generator 222 using the above-listed processing steps (A)-(C). The data of optical data unit ODUk are organized in 3824 columns and four rows, with each position containing one byte of data.

FIG. 3B pictorially shows an optical transport unit OTUk that can be generated by frame generator 222 using the above-listed processing step (D). The frame structure of optical transport unit OTUk is based on the frame structure of optical data unit ODUk which is extended to contain 256 additional columns for an OTUk FEC data block 302. An OTU overhead OTU OH is located in row 1, columns 1 to 14, of optical data unit ODUk. The overhead bytes in row 1, columns 1 to 7, of OTU overhead OTU OH are used for the frame-alignment overhead, which is labeled in FIG. 3B as FA OH. The overhead bytes in row 1, columns 8 to 14, of OTU overhead OTU OH are used for the OTUk-specific overhead, which is labeled in FIG. 3B as OTUk OH.

In various embodiments, the FEC code used for generating the OTUk FEC data block 302 can be an FEC code specified in the above-cited ITU-T G.709/Y.1331 Recommendation or any other suitable (e.g., proprietary) FEC code.

FIG. 3C pictorially shows a more-detailed (expanded) view of the OTU overhead OTU OH. Columns 1 to 6 of OTU OH are configured to carry a frame alignment signal FAS. Column 7 of OTU OH is configured to carry a multi-frame alignment signal MFAS. Columns 8 to 10 of OTU OH are configured to carry an overhead corresponding to the general communication channel GCCO. Columns 13 and 14 of OTU OH are configured to carry an overhead RES, which is reserved for proprietary use and future standardization. A more-detailed description of the various bytes of the OTU overhead OTU OH shown in FIG. 3C can be found, e.g., in the above-cited ITU-T G.709/Y.1331 Recommendation.

In an example embodiment, at least one byte (e.g., column 14) of overhead RES can be used to carry a binary value that represents the error count determined by frame decoder 272 at the above-listed processing step (F). The manner in which this binary value can be computed and used by controller 240 is described in more detail below in reference to FIGS. 5-12.

Figure 4:
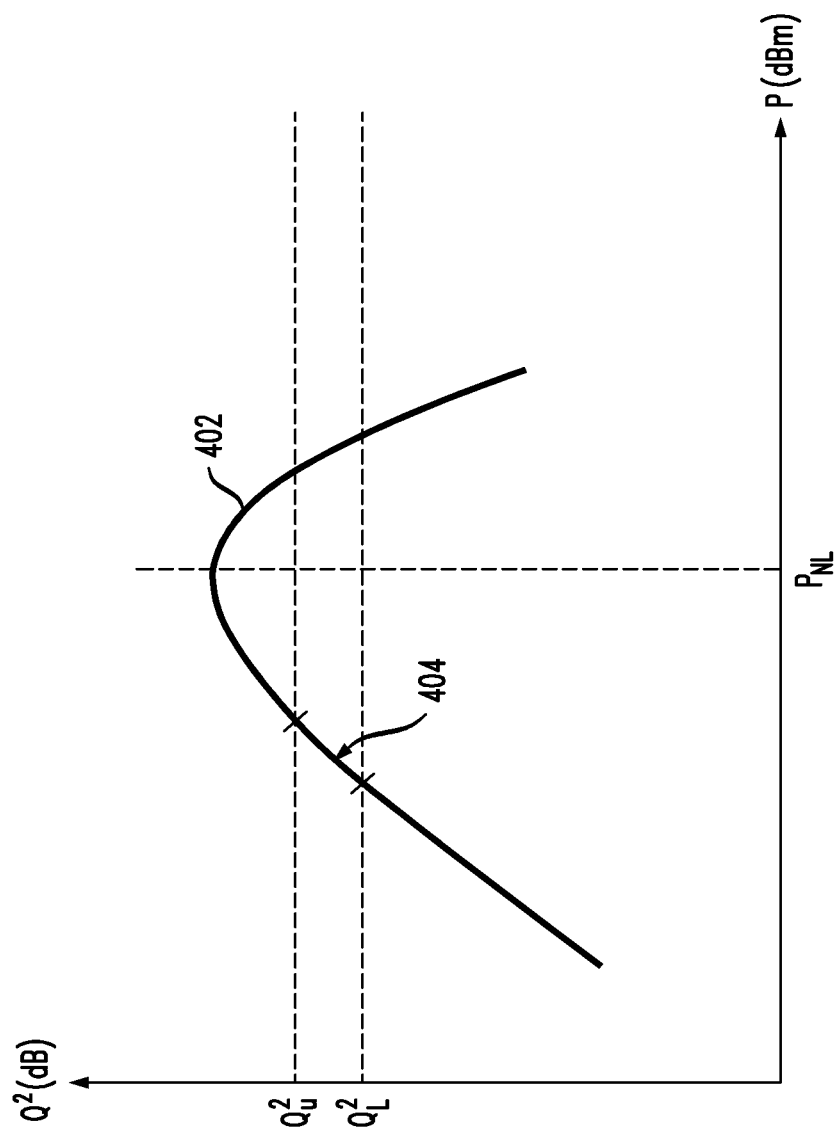
FIG. 4 graphically illustrates example performance characteristics of the communication system of FIG. 1 according to an embodiment.

FIG. 4 graphically illustrates example performance characteristics of system 100 according to an embodiment. More specifically, a curve 402 in the graph of FIG. 4 represents an example dependence of the quality factor $Q^2$ measured at the optical receiver 250 of a transceiver 110 located at one (e.g., West) end of link 150 as a function of output optical power of laser 232 of the corresponding transceiver 110 located at the other (e.g., East) end of link 150. Curve 402 has a maximum at the output power $P_{NL}$. At the optical power levels that are below $P_{NL}$, the quality factor $Q^2$ generally increases with an increase of the laser output power. At the optical power levels that are above $P_{NL}$, the quality factor $Q^2$ generally decreases with an increase of the laser output power, primarily due to the increasing detrimental contributions of nonlinear optical effects in link 150.

Target characteristics of a transmitter/receiver pair that communicate with one another over link 150 can be specified using a range of the quality-factor values located between $Q^2_L$ and $Q^2_U$, where $Q^2_L$ is the lower limit of the range, and $Q^2_U$ is the upper limit of the range. Typically, the values of $Q^2_L$ and $Q^2_U$ are the design and/or configuration parameters of system 100 that may be selected and/or specified by the system operator based on the intended use of the system. Once selected, the values of $Q^2_L$ and $Q^2_U$ can be stored in controller 240 for further use in the pertinent algorithms and/or protocols employed, e.g., for configuring transceiver 110 for optimal performance as described in reference to FIGS. 5-12.

In some embodiments, the values of $Q^2_L$ and $Q^2_U$ can be made applicable to multiple carrier wavelengths (optical WDM channels). In some embodiments, a different respective pair of $Q^2_L$ and $Q^2_U$ can be specified for each carrier wavelength (e.g., managed on a per-channel basis). In some embodiments, the $Q^2_L$ and/or $Q^2_U$ values can be made dependent on some other system-configuration parameters, such as the modulation format, the type of the used FEC code, the FEC-code rate, etc.

A person of ordinary skill in the art will understand that the use of the quality factor $Q^2$ represents only one of many possible ways of specifying and/or attaining a desired (e.g., optimal) configuration of system 100. For example, in an alternative embodiment, the optical signal-to-noise ratio (OSNR) or the bit error rate (BER) can similarly be used. In some embodiments, other suitable measures of transmission quality can alternatively be used.

The BER is the most-direct indicator of the transmission quality. For example, due to the adverse effects of noise, nonlinearities, and dispersion, the waveforms of optical signals coupled into fibers typically become distorted when those optical signals arrive at the remote end of the fiber-optic link, such as link 150. As a result, bit errors are typically present when the receiver converts the optical signals into the corresponding electrical signals and then decodes the latter. A greater number of pre-FEC bit errors is therefore an indication of the poorer transmission quality, and vice versa. The quality factor $Q^2$ and BER have a one-to-one correspondence that can be expressed, e.g., as follows:

$$BER = \frac{1}{2}\text{erfc}\left(\frac{Q}{\sqrt{2}}\right) \approx \frac{1}{\sqrt{2\pi}\,Q}\exp\left(-\frac{Q^2}{2}\right) \quad (1)$$

The OSNR is the ratio of the signal power to the noise power within a valid bandwidth. At power levels below $P_{NL}$ (see FIG. 4), the changes of the OSNR and of the Q value expressed in decibel are approximately linearly proportional to one another. Eq. (2) gives the expression that can be used to convert the quality factor $Q^2$ into the Q value expressed in decibel, e.g., for relating the latter to the OSNR:

$$Q(dB) = 10\,\log_{10}(Q^2) \quad (2)$$

In an example embodiment, Eqs. (1)-(2) can be used to program controller 240 to interconvert various possible quantitative measures of the end-to-end transmission performance of a wavelength channel in system 100.

As used herein below, the term "measure of transmission quality" should be construed to cover each and any of: (i) the quality factor $Q^2$; (ii) the Q value expressed in decibel; (iii) the BER, e.g., expressed as the number of FEC-code-corrected errors per data frame; and (iv) the OSNR. These quantities can be inter-converted, e.g., in the above-explained manner. Furthermore, the term "measure of transmission quality" should also be construed to cover any other value or quantity that can be unambiguously mapped onto any one of those parameters. One or more of such "measures of transmission quality" (e.g., one per carrier wavelength, per transmission direction) can be used to configure and operate various embodiments of system 100, e.g., as further explained below.

Figure 5:
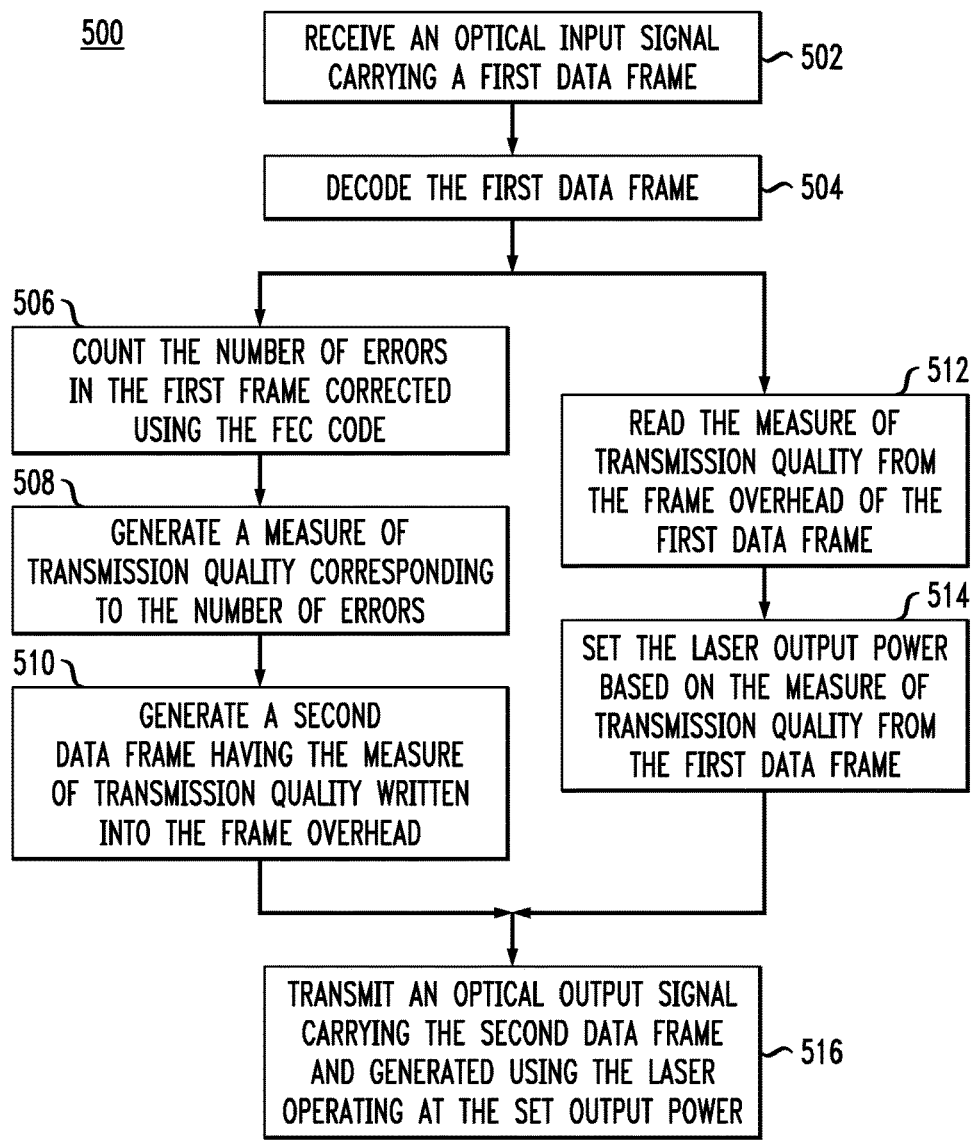
FIG. 5 shows a flowchart of a communication method that can be used in the optical transceiver of FIG. 2 according to an embodiment.

FIG. 5 shows a flowchart of a communication method 500 that can be used in transceiver 110 (FIG. 2) according to an embodiment. For illustration purposes and without any implied limitations, method 500 is described in reference to the frame format shown in FIGS. 3A-3B. A person of ordinary skill in the art will understand that other suitable frame formats may similarly be used.

At step 502 of method 500, receiver 250 (FIG. 2) operates to receive an optical input signal 248 carrying a first data frame transmitted by the corresponding remote transceiver 110 (also see FIG. 1).

At step 504, frame decoder 272 of receiver 250 processes the first frame to recover the corresponding client data 298 encoded therein. This processing includes using the operative FEC code and the FEC data block 302 (see FIG. 3B) of the first data frame to correct errors (if any) in the first data frame. This processing further includes reading information from the various overhead fields, such as the fields of OTU OH (FIG. 3C).

At step 506, sub-module 276 of frame decoder 272 counts the number of errors that have been corrected using the FEC code at step 504. Frame decoder 272 then provides the FEC error count, by way of control signal 236, to controller 240.

At step 508, controller 240 generates control signal 206 in response to the control signal 236 of step 506. More specifically, controller 240 generates control signal 206 in a manner that causes this control signal to carry a measure of transmission quality corresponding to the FEC error count of step 506. As already indicated above, the measure of transmission quality may be any one of the quality factor $Q^2$, the Q value expressed in decibel, the BER, the OSNR, or any other suitable quantity.

For example, in an embodiment in which such measure of transmission quality is not the same as BER, controller 240 may be configured to: (i) convert the FEC error count of step 506 into the corresponding BER value, e.g., as known in the art; and (ii) convert the latter BER value into the corresponding measure of transmission quality, e.g., as explained above in reference to FIG. 4 and/or Eqs. (1)-(2).

At step 510, frame generator 226 of transmitter 210 generates a second data frame using the corresponding client data 202 and the measure of transmission quality provided thereto by control signal 206 generated at step 508. For example, step 510 may include a sub-step of writing the provided measure of transmission quality into the designated field of OTU OH, such as the overhead RES (see FIG. 3C) of the second data frame, said writing being performed using sub-module 224 of frame generator 226. Step 510 may also include a sub-step of generating the FEC data block 302 (see FIG. 3B) for the second data frame using the operative FEC code.

At step 512, sub-module 274 of frame decoder 272 reads the measure of transmission quality from the designated field of OTU OH, such as the overhead RES (see FIG. 3C) of the first data frame. Frame decoder 272 then provides this measure of transmission quality, by way of control signal 234, to controller 240.

At step 514, controller 240 generates control signal 244 in response to the control signal 234 of step 512. More specifically, controller 240 operates to generate control signal 244 that is configured to cause laser 232 of transmitter 210 to set (e.g., change) its optical output power based on the measure of transmission quality provided at step 512. Example embodiments of the sub-step of setting the optical output power of laser 232 that can be used to implement step 514 are described below in reference to FIGS. 6-12.

At step 516, transmitter 210 uses the optical power set at step 514 to generate an optical output signal 212 carrying the second data frame generated at step 510. Transmitter 210 then operates to transmit the optical output signal 212 generated in this manner to the corresponding remote transceiver 110 (also see FIG. 1).

Figure 6:
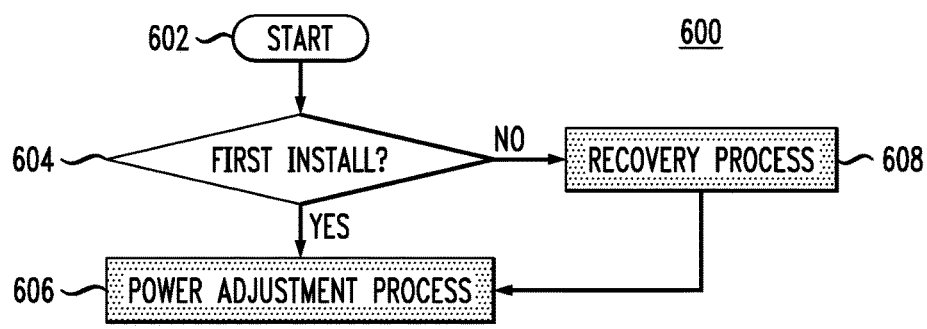
FIG. 6 shows a flowchart of a control method that can be used in the optical transceiver of FIG. 2 according to an embodiment.

FIG. 6 shows a flowchart of a control method 600 that can be used in transceiver 110 (FIG. 2) according to an embodiment. For illustration purposes and without any implied limitations, method 600 is described in reference to an embodiment in which the measure of transmission quality is the quality factor $Q^2$. Based on the provided description, a person of ordinary skill in the art will be able to make and use other embodiments, in which the measure of transmission quality is different from the quality factor $Q^2$. Method 600 can be used in conjunction with method 500.

Method 600 is generally directed at setting the output optical power of laser 232 in the local transmitter 210 such that (i) the output optical power is smaller than $P_{NL}$ and (ii) the corresponding remote receiver 250 is placed into an operating regime characterized by the quality factor $Q^2$ whose value is between the values of $Q^2_L$ and $Q^2_U$ (also see FIG. 4). As already indicated above, the values of $Q^2_L$ and $Q^2_U$ are the design and/or configuration parameters and, as such, have fixed values for the purposes of method 600. The threshold power $P_{NL}$ is a system characteristic that can be determined within method 600, e.g., by appropriately analyzing the history of its execution generated and stored in the memory as explained in more detail below.

Method 600 starts at step 602 during which the corresponding transceiver 110 is turned on, booted up, and brought online.

Step 604 is configured to direct the processing of method 600 along two different processing paths depending on the encountered situation. More specifically, for the first install of transceiver 110, the processing of method 600 is directed to step 606. Otherwise, the processing of method 600 is directed to step 608. In the latter case, step 606 is performed after the completion of step 608.

An example embodiment of step 606 is described in reference to FIGS. 7-10.

Figure 11:
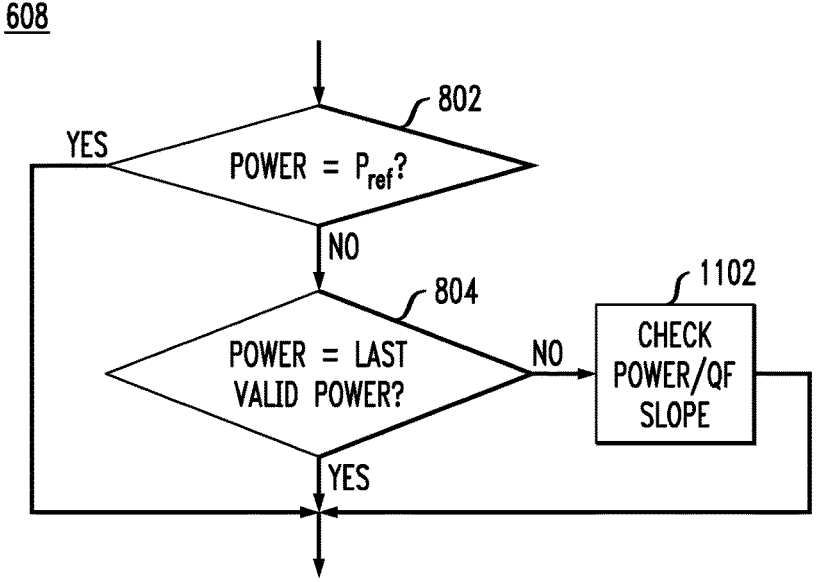
FIG. 11 shows a flowchart of another processing step that can be used in the control method of FIG. 6 according to an embodiment.
Figure 12:
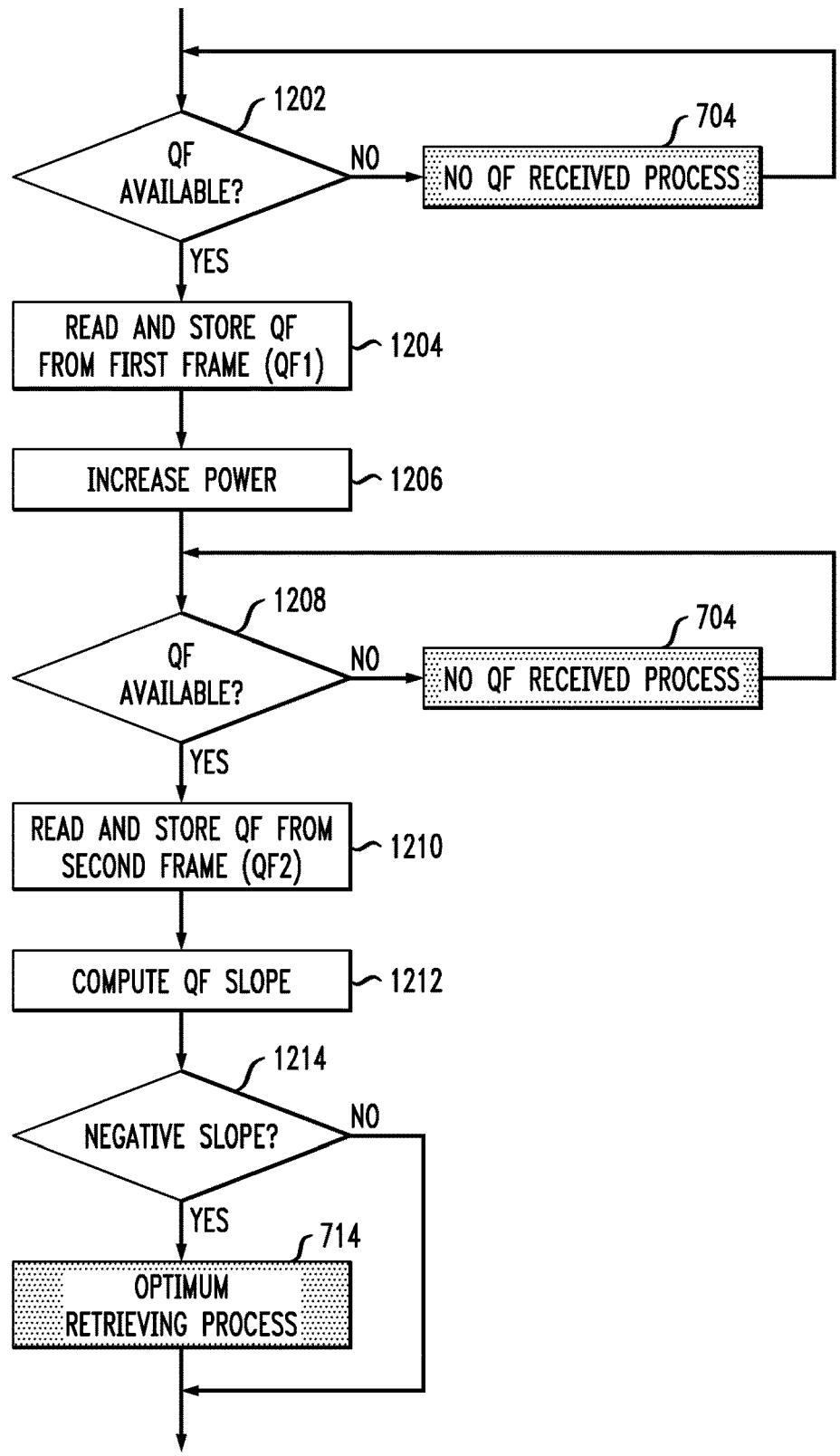
FIG. 12 shows a flowchart of a processing sub-step that can be used in the processing step of FIG. 11 according to an embodiment.

An example embodiment of step 608 is described in reference to FIGS. 11-12.

Figure 7:
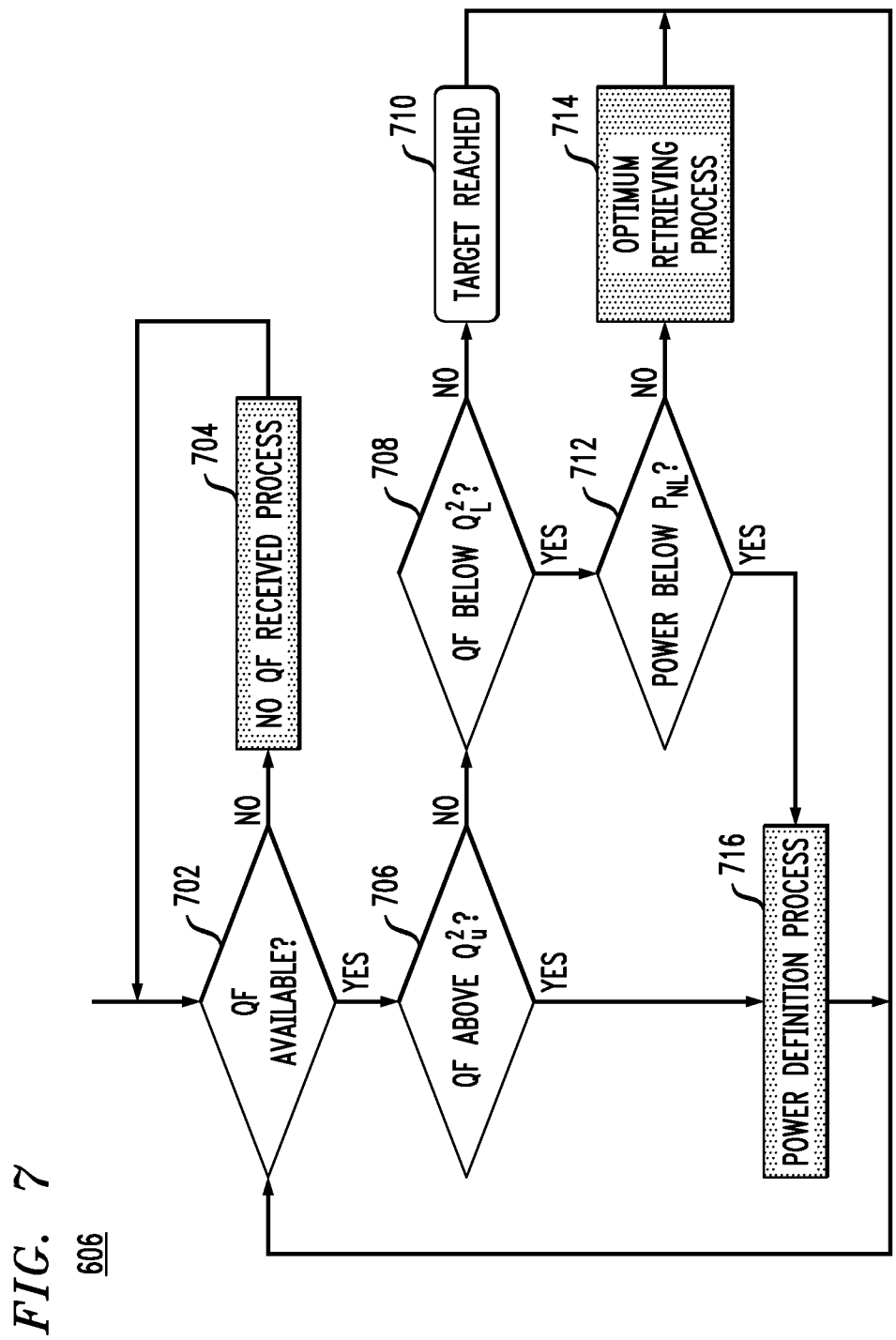
FIG. 7 shows a flowchart of a processing step that can be used in the control method of FIG. 6 according to an embodiment.

FIG. 7 shows a flowchart of step 606 according to an embodiment. During the power-adjustment process of step 606, controller 240 may store the history of its execution in a memory. In an example embodiment, each entry in the history may include the optical output power of laser 232 and the resulting value of the quality factor $Q^2$ obtained at the remote receiver 250 and communicated back to controller 240, e.g., using method 500 (FIG. 5). The stored history can be used, e.g., to determine if an optimum configuration has been passed or missed during the power-adjustment process of step 606.

Sub-step 702 is configured to direct the processing of step 606 along two different processing paths depending on whether or not the overhead of the incoming data frame contains a quality-factor (QF) value. If the corresponding remote receiver 250 has included a QF value in the frame overhead, then the processing of step 606 is directed to sub-step 706. Otherwise, the processing of step 606 is directed to sub-step 704.

Figure 8:
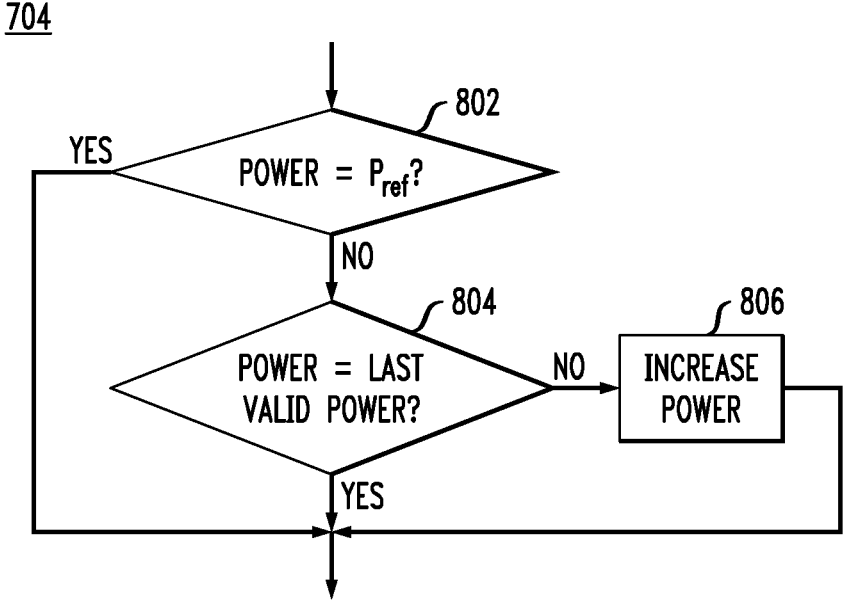
FIG. 8 shows a flowchart of a processing sub-step that can be used in the processing step of FIG. 7 according to an embodiment.

An example embodiment of step 704 is described in reference to FIG. 8.

Sub-steps 706, 708, and 712 are configured to direct the processing of step 606 along different processing paths depending on (i) the result of the comparison of the received QF value with the values of $Q^2_L$ and $Q^2_U$ and (ii) the result of the comparison of the corresponding output optical power of laser 232 with the threshold power $P_{NL}$.

If the received QF value is greater than $Q^2_U$, then the processing of step 606 is directed to sub-step 716. Otherwise, the processing of step 606 is directed to sub-step 708.

If the received QF value is smaller than $Q^2_L$, and if the corresponding output optical power of laser 232 is greater than the threshold power $P_{NL}$, then the processing of step 606 is directed to sub-step 714.

If the received QF value is smaller than $Q^2_L$, and if the corresponding output optical power of laser 232 is smaller than the threshold power $P_{NL}$, then the processing of step 606 is directed to sub-step 716.

If the received QF value is between the values of $Q^2_L$ and $Q^2_U$, then the processing of step 606 is directed to sub-step 710.

At sub-step 710, controller 240 concludes that the output optical power of laser 232 is at an acceptable level, and proceeds to generate control signal 244 such that the output optical power of laser 232 remains unchanged.

Figure 9:
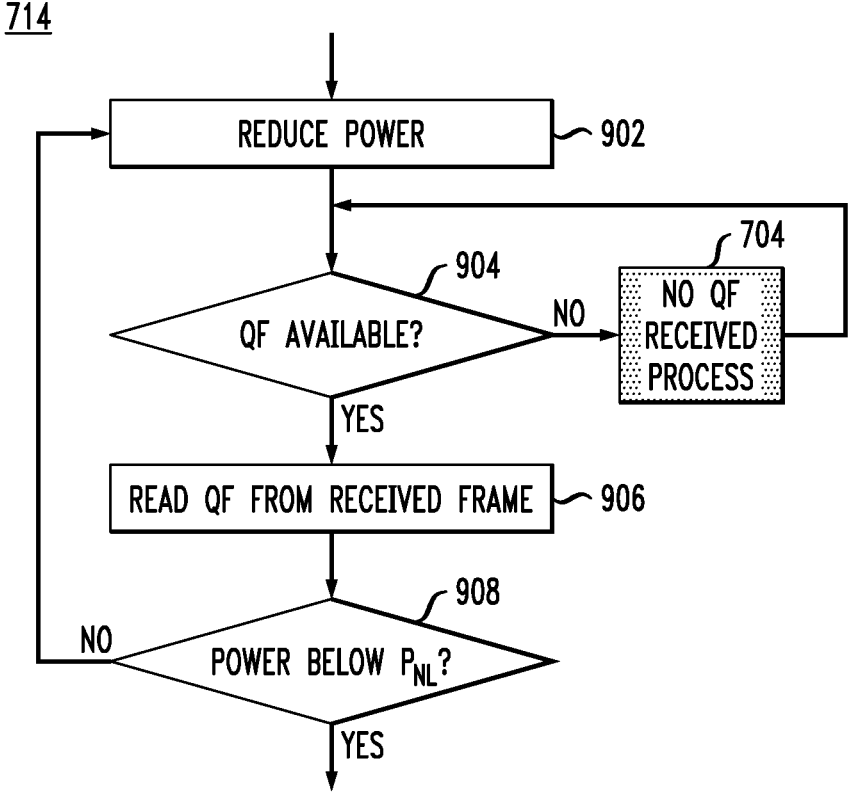
FIG. 9 shows a flowchart of another processing sub-step that can be used in the processing step of FIG. 7 according to an embodiment.

An example embodiment of sub-step 714 is described in reference to FIG. 9.

Figure 10:
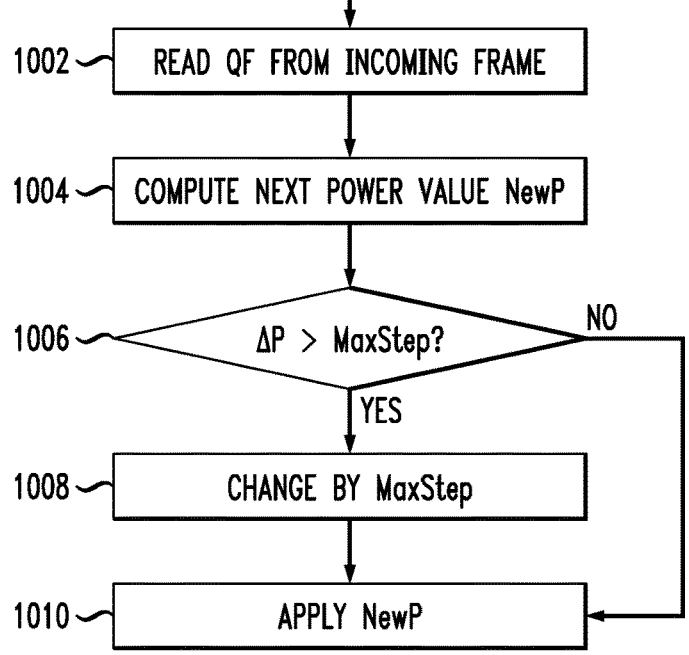
FIG. 10 shows a flowchart of yet another processing sub-step that can be used in the processing step of FIG. 7 according to an embodiment.

An example embodiment of sub-step 716 is described in reference to FIG. 10.

FIG. 8 shows a flowchart of sub-step 704 according to an embodiment.

At sub-step 802 of sub-step 704, it is determined whether or not the output optical power of laser 232 is set to $P_{ref}$. If yes, then the processing of sub-step 704 is terminated. Otherwise, the processing of sub-step 704 is directed to sub-step 804.

In an example embodiment, $P_{ref}$ is a fixed reference power. The value of $P_{ref}$ is a design parameter that defines the maximum power to be used while a QF value is not yet delivered from the corresponding remote transceiver 110 on the received data frame(s).

At sub-step 804, it is determined whether or not the output optical power of laser 232 is set to a last valid value of the output optical power. If yes, then the processing of sub-step 704 is terminated. Otherwise, the processing of sub-step 704 is directed to sub-step 806.

In an example embodiment, the term "last valid value" refers to a recent output optical power that resulted in a QF value within the target range, i.e., between the values of $Q^2_L$ and $Q^2_U$. A last valid value is typically stored in the memory of controller 240 and can be retrieved therefrom.

At sub-step 806, controller 240 operates to generate control signal 244 such that the output optical power of laser 232 is increased by a relatively small increment. In an example embodiment, the increment can be determined as a fixed percentage of the difference between $P_{ref}$ and the present output optical power of laser 232. After the execution of sub-step 806, the processing of sub-step 704 is terminated.

FIG. 9 shows a flowchart of sub-step 714 according to an embodiment. The power adjustment process corresponding to sub-step 714 is generally directed at gradually shifting the operating point along curve 402 toward a portion 404 of the curve located between the values of $Q^2_L$ and $Q^2_U$ at the power levels that are below the threshold power $P_{NL}$ (see FIG. 4). As used herein the term "gradually" refers to relatively small incremental changes that do not perturb too much the operation of other transceivers 110 transmitting in the same direction through link 150 on other carrier wavelengths. A person of ordinary skill in the art will understand that gradual changes are typically needed to maintain the overall operating stability of the corresponding WDM transceiver 102 in which individual transceivers 110 are configured for independent power adjustment using methods 500 and 600.

At sub-step 902 of sub-step 714, controller 240 operates to generate control signal 244 such that the output optical power of laser 232 is decreased by a relatively small increment. In an example embodiment, the increment value can be a fixed parameter.

At sub-step 904, it is determined whether or not the overhead of the incoming data frame contains a QF value corresponding to the decreased output optical power that was set at sub-step 902. If the corresponding remote receiver 250 has included such a QF value in the frame overhead, then the processing of sub-step 714 is directed to sub-step 906. Otherwise, the processing of sub-step 714 is directed to sub-step 704, a copy of which is incorporated into the processing flow as shown in FIG. 9 (also see FIG. 8).

At sub-step 906, the QF value is read from the overhead of the received data frame. Controller 240 then generates a corresponding entry for the history stored in the memory. This entry contains (i) the QF value read from the overhead of the received data frame and (ii) the corresponding output optical power of laser 232 that was set at sub-step 902.

At sub-step 908, it is determined whether or not the output optical power of laser 232 that was set at sub-step 902 is below the threshold power $P_{NL}$. If yes, then the processing of sub-step 714 is terminated. Otherwise, the processing of sub-step 714 is returned back to sub-step 902.

FIG. 10 shows a flowchart of sub-step 716 according to an embodiment. The power adjustment process corresponding to sub-step 716 has a similar purpose to that of sub-step 714. However, the staring point on curve 402 for sub-step 716 is different from the staring point on curve 402 for sub-step 714 due to a different processing path through sub-steps 706, 708, and 712. As a result, the execution of sub-step 716 may cause the output optical power of laser 232 to decrease or increase, whereas the execution of sub-step 714 causes the output optical power of laser 232 only to decrease.

At sub-step 1002 of sub-step 716, the QF value is read from the overhead of the received data frame.

At sub-step 1004, controller 240 uses the QF value of step 1002 to determine a next possible value NewP of the output optical power of laser 232. In an example embodiment, this next possible value can be a power that shifts the operating point along curve 402 (FIG. 4) by a power increment needed to place the operating point within portion 404 of curve 402 (see FIG. 4). Controller 240 may need to access the history stored in its memory to make this determination of the next possible value of the output optical power of laser 232.

Sub-step 1006 serves as a check against unacceptably large changes of the output optical power of laser 232. As already explained above in reference to FIG. 9 the changes of the output optical power of laser 232 need to be gradual to keep the corresponding perturbations for other transceivers 110 at a safe level. As such, at sub-step 1006, controller 240 operates to (i) determine the power increment ΔP that is needed to reach the possible value of the output power computed at step 1004 and (ii) compare ΔP with a fixed threshold value MaxStep. The fixed threshold value MaxStep is an algorithm parameter that is judged to guarantee the "gradual" pace of the power changes.

If it is determined at sub-step 1006 that ΔP>MaxStep, then the processing of sub-step 716 is directed to sub-step 1008. Otherwise, the processing of sub-step 716 is directed to sub-step 1010.

At sub-step 1008, the next possible value NewP computed at step 1004 is replaced by a different value of NewP that is computed by applying the increment MaxStep to the present output power instead of the power increment ΔP, which was judged at sub-step 1006 to be too large.

At sub-step 1010, controller 240 operates to generate control signal 244 such that the output optical power of laser 232 is changed to NewP. Depending on the result of sub-step 1006, the value of NewP can be the value computed at sub-step 1004 or the value computed at sub-step 1008.

FIG. 11 shows a flowchart of step 608 according to an embodiment. As shown, step 608 is implemented by modifying sub-step 704 shown in FIG. 8, with the modification being the replacement of sub-step 806 by sub-step 1102. As such, for the description of sub-steps 802 and 804 of step 608, the reader is referred to the description of FIG. 8. An example embodiment of sub-step 1102 is described in reference to FIG. 12.

FIG. 12 shows a flowchart of sub-step 1102 according to an embodiment. The processing flow of sub-step 1102 incorporates two copies of sub-step 704 and a copy of sub-step 714. For the description of the latter two, the reader is referred to the description of FIGS. 8 and 9, respectively.

At sub-step 1202, it is determined whether or not the overhead of a first received data frame contains a QF value. If the corresponding remote receiver 250 has included such a QF value in the frame overhead, then the processing of sub-step 1102 is directed to sub-step 1204. Otherwise, the processing of sub-step 1102 is directed to a first copy of sub-step 704.

At sub-step 1204, the QF value is read from the overhead of the first received data frame. Controller 240 then generates a corresponding entry for the history stored in the memory. This entry contains (i) the QF value read from the overhead of the first received data frame and (ii) the corresponding output optical power of laser 232.

At sub-step 1206, controller 240 operates to generate control signal 244 such that the output optical power of laser 232 is increased by a relatively small increment. In an example embodiment, the increment can be smaller than MaxStep (see FIG. 10).

At sub-step 1208, it is determined whether or not the overhead of a second received data frame contains a QF value. If the corresponding remote receiver 250 has included such a QF value in the frame overhead, then the processing of sub-step 1102 is directed to sub-step 1210. Otherwise, the processing of sub-step 1102 is directed to a second copy of sub-step 704.

At sub-step 1210, the QF value is read from the overhead of the second received data frame. Controller 240 then generates a corresponding entry for the history stored in the memory. This entry contains (i) the QF value read from the overhead of the second received data frame and (ii) the corresponding increased output optical power of laser 232 that was set at sub-step 1206.

At sub-step 1212, controller 240 uses the history entries stored in the memory at sub-steps 1204 and 1208 to compute the QF slope S as follows:

$$S = \frac{QF_2 - QF_1}{P_2 - P_1} \tag{3}$$

where $(QF_1, P_1)$ is the history entry stored in the memory at sub-step 1204; and $(QF_2, P_2)$ is the history entry stored in the memory at sub-step 1208.

At sub-step 1214, controller 240 determines the sign of the QF slope S computed at sub-step 1212. If the sign of S is negative, then the processing of sub-step 1102 is directed to sub-step 714, a copy of which is incorporated into the processing flow of sub-step 1102. Otherwise, the copy of sub-step 714 is bypassed, and the processing of sub-step 1102 is terminated as indicated in FIG. 12.

According to an example embodiment disclosed above, e.g., in the summary section and/or in reference to any one or any combination of some or all of FIGS. 1-12, provided is an apparatus (e.g., 100, FIG. 1; 110, FIG. 2) comprising an optical data receiver (e.g., 250, FIG. 2), an optical data transmitter (e.g., 210, FIG. 2), and an electronic controller (e.g., 240, FIG. 2) connected therebetween, the optical data receiver including a photodetector (e.g., 262, FIG. 2) configured to detect an optical input signal (e.g., 248, FIG. 2) carrying a first data frame, the optical data transmitter including a laser (e.g., 232, FIG. 2) configured to generate a carrier wavelength for an optical output signal (e.g., 212, FIG. 2); wherein the optical data receiver comprises a frame decoder (e.g., 272, FIG. 2) configured to read a first value of a measure of transmission quality from an overhead (e.g., OTUk OH, FIG. 3B) of the first data frame, the measure of transmission quality representing an error rate at which an FEC code used at a remote receiver encounters errors in data transmitted using the optical output signal; and wherein the electronic controller is configured to change an optical output power of the laser (e.g., using 244, FIG. 2) in response to the first value of the measure of transmission quality provided thereto (e.g., by way of 234, FIG. 2) by the frame decoder.

In some embodiments of the above apparatus, the measure of transmission quality is one of: (i) a quality factor $Q^2$ corresponding to the error rate (e.g., Eq. (1)); (ii) a Q value derived from the quality factor $Q^2$ and expressed in decibel (e.g., Eq. (2)); (iii) a number of errors per data frame corrected by the FEC code; and (iv) an optical signal-to-noise ratio corresponding to the quality factor $Q^2$.

In some embodiments of any of the above apparatus, the frame decoder is further configured to count (e.g., at 276, FIG. 2) a number of errors corrected in the first data frame using an FEC data block (e.g., 302, FIG. 3B) thereof; wherein the electronic controller is configured to compute a second value of the measure of transmission quality using the number of errors counted by the frame decoder; wherein the optical data transmitter comprises a frame generator (e.g., 222, FIG. 2) configured to write (e.g., using 206 and 224, FIG. 2) the second value of the measure of transmission quality into an overhead (e.g., OTUk OH, FIG. 3B) of a second data frame; and wherein the optical data transmitter is configured to cause the optical output signal to carry the second data frame.

In some embodiments of any of the above apparatus, the frame generator is further configured to include an FEC data block (e.g., 302, FIG. 3B) into the second data frame, the FEC data block of the second data frame being computed using the overhead of the second data frame and a payload of the second data frame, the overhead being configured to carry one or more values of the measure of transmission quality.

In some embodiments of any of the above apparatus, the apparatus further comprises a plurality of optical data transmitters (e.g., 110$_{1W}$-110$_{NW}$, FIG. 1), each configured to use a different respective carrier wavelength (e.g., $\lambda_1$-$\lambda_N$, FIG. 1), the optical data transmitter being one of the plurality.

In some embodiments of any of the above apparatus, the apparatus further comprises a plurality of optical data receivers (e.g., 110$_{1W}$-110$_{NW}$, FIG. 1), each configured to receive a different respective carrier wavelength (e.g., $\lambda_1$-$\lambda_N$, FIG. 1), the optical data receiver being one of the plurality.

In some embodiments of any of the above apparatus, the electronic controller is configured to change the optical output power of the laser (e.g., using 600, FIG. 6) to cause a value of the measure of transmission quality from an overhead of another data frame received by the optical data receiver from the remote receiver at a later time to be within a predetermined fixed range of values (e.g., between $Q^2_L$ and $Q^2_U$, FIG. 4).

In some embodiments of any of the above apparatus, the electronic controller is configured to dynamically change the optical output power of the laser (e.g., using 600, FIG. 6) in response to a sequence of values of the measure of transmission quality, each of said values being read from an overhead of a different respective data frame carried by the optical input signal.

In some embodiments of any of the above apparatus, the first data frame comprises an optical transport unit (e.g., OTUk, FIG. 3B) generated in accordance with an ITU-T G.709/Y.1331 Recommendation.

In some embodiments of any of the above apparatus, the electronic controller is configured to change the optical output power of the laser by an increment determined in response to the first value of the measure of transmission quality, the increment being smaller than or equal to a predetermined fixed value (e.g., MaxStep, FIG. 10).

In some embodiments of any of the above apparatus, the electronic controller is configured to store therein a history of power changes, each entry in the history including a respective optical output power of the laser and a corresponding value of the measure of transmission quality received from the remote receiver.

According to another example embodiment disclosed above, e.g., in the summary section and/or in reference to any one or any combination of some or all of FIGS. 1-12, provided is an apparatus (e.g., 100, FIG. 1; 110, FIG. 2) comprising an optical data receiver (e.g., 250, FIG. 2), an optical data transmitter (e.g., 210, FIG. 2), and an electronic controller (e.g., 240, FIG. 2) connected therebetween, the optical data receiver including a photodetector (e.g., 262, FIG. 2) configured to detect an optical input signal (e.g., 248, FIG. 2) carrying a first data frame, the optical data transmitter including a laser (e.g., 232, FIG. 2) configured to generate a carrier wavelength for an optical output signal (e.g., 212, FIG. 2) carrying a second data frame; wherein the optical data receiver comprises a frame decoder (e.g., 272, FIG. 2) configured to count (e.g., at 276, FIG. 2) a number of errors corrected in the first data frame using an FEC data block (e.g., 302, FIG. 3B) thereof; wherein the electronic controller is configured to compute a first value of a measure of transmission quality using the number of errors counted by the frame decoder; and wherein the optical data transmitter comprises a frame generator (e.g., 222, FIG. 2) configured to write (e.g., using 206 and 224, FIG. 2) the first value of the measure of transmission quality into an overhead (e.g., OTUk OH, FIG. 3B) of the second data frame.

In some embodiments of any of the above apparatus, the measure of transmission quality is one of: (i) a quality factor $Q^2$ corresponding to the number of errors (e.g., Eq. (1)); (ii) a Q value derived from quality factor $Q^2$ and expressed in decibel (e.g., Eq. (2)); (iii) the number of errors; and (iv) an optical signal-to-noise ratio corresponding to the quality factor $Q^2$.

In some embodiments of any of the above apparatus, the frame generator is further configured to include an FEC data block (e.g., 302, FIG. 3B) into the second data frame, the FEC data block of the second data frame being computed using the overhead of the second data frame and a payload of the second data frame, the overhead being configured to carry one or more values of the measure of transmission quality.

In some embodiments of any of the above apparatus, the frame decoder is configured to read a second value of the measure of transmission quality from an overhead (e.g., OTUk OH, FIG. 3B) of the first data frame; and wherein the electronic controller is configured to change an optical output power of the laser (e.g., using 244, FIG. 2) in response to the second value of the measure of transmission quality provided thereto (e.g., by way of 234, FIG. 2) by the frame decoder.

According to another example embodiment disclosed above, e.g., in the summary section and/or in reference to any one or any combination of some or all of FIGS. 1-12, provided is a communication method (e.g., 500, FIG. 5) that can be carried out at an optical transceiver (e.g., 110, FIG. 2), the method comprising the steps of: receiving (e.g., 502, FIG. 5) an optical input signal carrying a first data frame; decoding (e.g., 504, FIG. 5) the first data frame to read (e.g., 512, FIG. 5) a first value of a measure of transmission quality from an overhead (e.g., OTUk OH, FIG. 3B) of the first data frame, the measure of transmission quality representing an error rate at which an FEC code used at a remote receiver encounters errors in data received from the optical transceiver; and changing (e.g., 514, FIG. 5) an optical output power of a laser (e.g., 232, FIG. 2) in response to the first value of the measure of transmission quality, the laser being configured to generate a carrier wavelength for an optical output signal directed to the remote receiver.

In some embodiments of the above method, the method further comprises the steps of: counting (e.g., 506, FIG. 5) a number of errors corrected in the first data frame using an FEC data block (e.g., 302, FIG. 3B) thereof; computing (e.g., 508, FIG. 5) a second value of the measure of transmission quality using the number of errors; writing (e.g., 510, FIG. 5) the second value of the measure of transmission quality into an overhead (e.g., OTUk OH, FIG. 3B) of a second data frame; and transmitting (e.g., 516, FIG. 5) the optical output signal to the remote receiver, the optical output signal being configured to carry the second data frame.

In some embodiments of any of the above methods, the method further comprises the step of including an FEC data block (e.g., 302, FIG. 3B) into the second data frame, the FEC data block of the second data frame being computed using the overhead of the second data frame and a payload of the second data frame, the overhead being configured to carry one or more values of the measure of transmission quality.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical data receiver, an optical data transmitter, and an electronic controller connected therebetween, the optical data receiver including a photodetector configured to detect an optical input signal carrying a first data frame, the optical data transmitter including a laser configured to generate a carrier wavelength for an optical output signal;
   wherein the optical data receiver comprises a frame decoder configured to read a first value of a measure of transmission quality from the first data frame, the measure of transmission quality representing an error rate at which an FEC code used at a remote receiver encounters errors in data transmitted using the optical output signal; and
   wherein the electronic controller is configured to:
      determine a sign of a slope of the measure of transmission quality with respect to an optical output power of the laser; and
      change the optical output power of the laser based on said sign and the first value of the measure of transmission quality provided thereto by the frame decoder.

2. The apparatus of claim 1, wherein the measure of transmission quality is one of:
   a quality factor $Q^2$ corresponding to the error rate;
   a Q value derived from the quality factor $Q^2$ and expressed in decibel;
   a number of errors per data frame corrected by the FEC code; and
   an optical signal-to-noise ratio corresponding to the quality factor $Q^2$.

3. The apparatus of claim 1,
   wherein the frame decoder is further configured to count a number of errors corrected in the first data frame using an FEC data block thereof;
   wherein the electronic controller is configured to compute a second value of the measure of transmission quality using the number of errors counted by the frame decoder;
   wherein the optical data transmitter comprises a frame generator configured to write the second value of the measure of transmission quality into a second data frame; and
   wherein the optical data transmitter is configured to cause the optical output signal to carry the second data frame.

4. The apparatus of claim 3, wherein the frame generator is further configured to include an FEC data block into the second data frame, the FEC data block of the second data frame being computed using an overhead of the second data frame and a payload of the second data frame, the overhead being configured to carry one or more values of the measure of transmission quality.

5. The apparatus of claim 1, further comprising a plurality of optical data transmitters, each configured to use a different respective carrier wavelength, the optical data transmitter being one of the plurality.

6. The apparatus of claim 1, further comprising a plurality of optical data receivers, each configured to receive a different respective carrier wavelength, the optical data receiver being one of the plurality.

7. The apparatus of claim 1, wherein the electronic controller is configured to change the optical output power of the laser to cause a value of the measure of transmission quality from another data frame received by the optical data receiver from the remote receiver at a later time to be within a predetermined fixed range of values.

8. The apparatus of claim 1, wherein the electronic controller is configured to dynamically change the optical output power of the laser in response to a sequence of values of the measure of transmission quality, each of said values being read from a different respective data frame carried by the optical input signal.

9. The apparatus of claim 1, wherein the first data frame comprises an optical transport unit generated in accordance with an ITU-T G.709/Y.1331 Recommendation.

10. The apparatus of claim 1, wherein the electronic controller is configured to change the optical output power of the laser by an increment determined in response to the first value of the measure of transmission quality, the increment being smaller than or equal to a predetermined fixed value.

11. The apparatus of claim 1, wherein the electronic controller is configured to store therein a history of power changes, each entry in the history including a respective optical output power of the laser and a corresponding value of the measure of transmission quality received from the remote receiver.

12. The apparatus of claim 1, wherein the electronic controller is configured to decrease the optical output power of the laser if said sign is negative.

13. At an optical transceiver, a communication method comprising:
   receiving an optical input signal carrying a first data frame;

decoding the first data frame to read a first value of a measure of transmission quality from the first data frame, the measure of transmission quality representing an error rate at which an FEC code used at a remote receiver encounters errors in data received from the optical transceiver;

determining a sign of a slope of the measure of transmission quality with respect to an optical output power of a laser; and changing the optical output power of the laser based on said sign and the first value of the measure of transmission quality, the laser being configured to generate a carrier wavelength for an optical output signal directed to the remote receiver.

14. The communication method of claim 13, further comprising:
counting a number of errors corrected in the first data frame using an FEC data block thereof;
computing a second value of the measure of transmission quality using the number of errors;
writing the second value of the measure of transmission quality into a second data frame; and
transmitting the optical output signal to the remote receiver, the optical output signal being configured to carry the second data frame.

15. The communication method of claim 14, further comprising including an FEC data block into the second data frame, the FEC data block of the second data frame being computed using an overhead of the second data frame and a payload of the second data frame, the overhead being configured to carry one or more values of the measure of transmission quality.

16. The communication method of claim 13, wherein the changing comprises decreasing the optical output power of the laser if said sign is negative.

17. An apparatus comprising an optical data receiver, an optical data transmitter, and an electronic controller connected therebetween, the optical data receiver including a photodetector configured to detect an optical input signal carrying a first data frame, the optical data transmitter including a laser configured to generate a carrier wavelength for an optical output signal;

wherein the optical data receiver comprises a frame decoder configured to read a first value of a measure of transmission quality from the first data frame, the measure of transmission quality representing an error rate at which an FEC code used at a remote receiver encounters errors in data transmitted using the optical output signal; and wherein the electronic controller is configured to:
change an optical output power of the laser in response to the first value of the measure of transmission quality provided thereto by the frame decoder; and
store therein a history of power changes, each entry in the history including a respective optical output power of the laser and a corresponding value of the measure of transmission quality received from the remote receiver.

* * * * *